June 25, 1968     C. E. GUTSHALL     3,389,734
LOCKING AND SEALING SCREW
Filed March 28, 1967
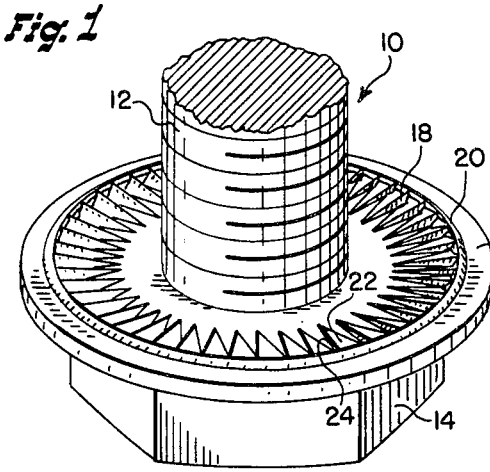
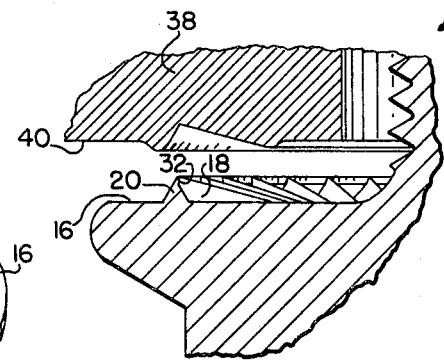
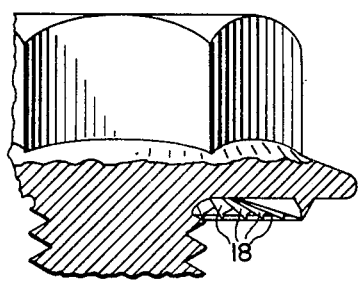
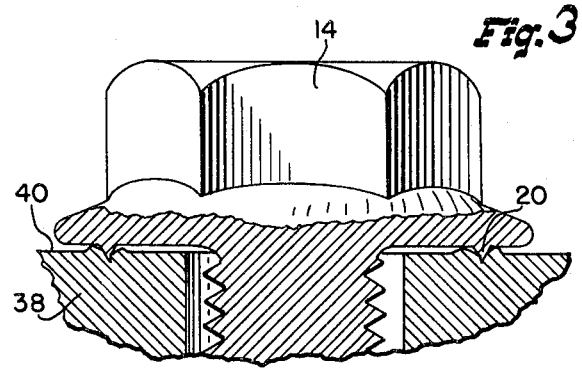
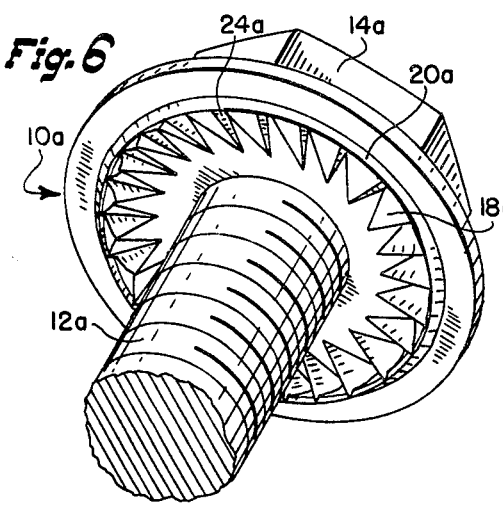
INVENTOR.
Charles E. Gutshall
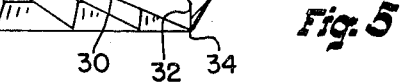
His Att'ys United States Patent Office 3,389,734
Patented June 25, 1968

3,389,734
LOCKING AND SEALING SCREW
Charles E. Gutshall, Roselle, Ill., assignor to Illinois Tool Works Inc., Chicago, Ill., a corporation of Delaware
Filed Mar. 28, 1967, Ser. No. 626,607
7 Claims. (Cl. 151—37)

ABSTRACT OF THE DISCLOSURE

A locking sealing threaded fastener having a plurality of teeth, integral with the clamping face of the head, and biased in a direction to resist removal of the fastener with an annular ring defining the radial extremities of said teeth and projecting axially from the clamping surface a distance equal to or slightly greater than said teeth.

---

Heretofore, several proposals have been made in the prior art for the use of integral locking teeth which interengage with the material of the work surface to lock the threaded fastener against retrograde rotation. A disadvantage of the prior art resided in the fact that rotation of the threaded fastener was inhibited by the locking teeth prior to the development of the desired tension within the fastener.

This invention relates to a locking sealing threaded fastener, such as a nut or screw, having a plurality of teeth integral with the clamping face of the head and biased in a direction to resist removal of the fastener and an annular ring defining the radial extremities of said teeth and projecting axially from the clamping surface a distance equal to or slightly greater than said teeth. The ring is preferably triangular in cross section and forms an obtuse angle between its radially outward surface and said clamping surface and at least a portion of its inner surface adjacent said teeth disposed in a plane perpendicular to said clamping surface to form a sharp edge at the juncture of said inner and outer surfaces.

It is an object of the present invention to provide a locking threading fastener capable of developing a desired amount of tension prior to the introduction of antirotation means by frictional engagement of the teeth with the work surface.

A further object of the invention is to provide a locking screw which has a definite sealing means for preventing the ingress and egress of materials from external sources or internal sources by providing a mechanical seal at the clamping face of the head.

A further object of the invention is to provide a threaded fastener in which adequate tension is built up before the locking feature of the fastener comes into effect.

Other objects will become apparent to those skilled in the art when the specification is read in conjunction with the drawings wherein:

FIG. 1 is a perspective view in partial section of the clamping face of a threaded fastener embodying the teachings of the present invention;

FIG. 2 is a fragmentary elevational view of a device of the type shown in FIG. 1 when associated with a work piece to show the effect of the sealing and locking features on the work piece;

FIG. 3 is an elevational view in partial section of a device of the type shown in FIG. 1 when seated on a work piece;

FIG. 4 is a fragmentary elevational view in partial section of a device of the type shown in FIG. 3 when disassociated from its work piece;

FIG. 5 is an enlarged fragmentary sectional view of the sealing feature embodied in the present invention; and FIG. 6 is a perspective view of another embodiment of the present invention.

Referring now to the drawings wherein similar reference characters are utilized throughout the drawings to identify similar parts; a threaded fastener 10, which in the illustrated embodiment is a screw, has a shank 12 and a head 14. The head 14 is provided with tool engaging means, in the present instance a plurality of wrenching faces. It should be recognized, of course, that the teachings of this invention are applicable not only to screws but to nuts and other forms of rotary fasteners as well. The head 14 has on its underface a clamping surface 16. The locking-sealing means of the present invention is integral with the clamping surface 16 and extend axially away from said surface. Locking means include a plurality of circumferentially disposed teeth 18 and a continuous annular ring 20. The teeth 18 are provided with a gentle slope 22 in the direction of application of the fastener and an abrupt locking surface 24 facing in the direction of removal of the fastener. Additionally, the radially inner extremities of the teeth 18 are spaced from the threaded means of the fastener and blend into the clamping surface 16 of the head 14. Teeth 18 increase in axial height as they extend radially outwardly. This can be clearly seen in FIGS. 2 and 5.

Encompassing all of the teeth 18 is the continuous sealing ring 20. The ring defines the radially outer limits of teeth 18. The ring in cross section, as best seen in FIG. 5, is substantially triangular in shape with its base integral with the clamping surface 16. The outer surface 28 slopes inwardly toward the axis of the fastener as it projects axially away from clamping surface 16. The inner surface 30 slopes outwardly away from the axis as it progresses axially away from surface 16 and at a different angle than outer surface 28. At least a portion 32 of inner surface 30 is disposed substantially perpendicular to clamping surface 16 and at its terminal extremity intersects said outer surface 28 and forms a sharp edge 34. Preferably, the sharp edge 34 is axially spaced from clamping surface 16 a distance equal to or greater than the greatest axial height of teeth 18, for purposes set forth hereinafter.

In application to a work member 38 the threaded fastener is brought to bear against the upper surface 40 with the sharp edge 34 making the initial contact on surface 40. Tension is developed in the fastener and as it continues to rotate or alternatively is drawn axially towards surface 40 by secondary means, not shown, the teeth 18 are brought to bear against surface 40. If the fastener is rotated the gentle slope 22 tends to scuff up material which is captured between adjacent teeth and when finally seated the abrupt surface 24 engages the material and resists retrograde rotation. The vertical or perpendicular portion 32 assists by acting as a hoop and restraining the exiting of materials from under the sharp edge 34 and thereby enhancing the retention of material captured between adjacent teeth. Further, the sharp edge 34 and the associated surfaces and portions of ring 20 provide a tight mechanical seal between the work piece and the fastener.

In the embodiment shown in FIGS. 1–5 the abrupt surface 24 is disposed radially to the axis of the fastener.

A second embodiment of the fastener is shown in FIG. 6 wherein similar numerals are utilized to designate similar parts with the addition of the suffix "a." The only significant difference between this embodiment and the previous embodiment described is the fact that the abrupt surface 24a is disposed in a non-radial disposition relative to the axis of the fastener. The angular incidence of abrupt surface 24 can vary from radial to being substantially tangential to the major diameter of the threaded means 12a of the fastener.

Fasteners of the type contemplated by the present invention are preferably cold headed products which are harder than the work piece with which they are to be associated. For example, the fastener can be headed from carbon steel wire and then hardened to provide the necessary locking characteristics. While the abrupt surface 24 is generally disposed in a plane that is parallel to or at a minimum angle to a plane passing through the axis of the fastener it should be realized that variations from this can be made. The angular disposition of the teeth relative to the clamping suface 16 when taken in conjunction with the hoop action of the ring tend to lock the head of the fastener to the work surface and additionally the ring 20 seals by the indentation of the surface. The combination of these locking and sealing features resist shear movement of the fastener relative to the work surface. With the teeth being brought to bear on the work surface only after a degree of ring penetration of the work surface, tension in the fastener is built up prior to the locking effect of the teeth taking place. One of the major problems which this fastener overcomes is the fact that the prior art did not permit adequate tension to be built up in a fastener and hence a secure fastening was never attained. It will be apparent to those skilled in the art that the teachings of this invention are applicable to screws, bolts and nuts and other rotary fasteners in which a locking seal is desired.

Other embodiments will be apparent to those skilled in the art and it is my intent that I be limited only by the appended claims.

I claim:
1. A self-locking threaded fastener including a head shaped to accommodate a driving tool, threaded means for screwing said fastener into fastening engagement with another member, one end of said head being substantially planar to form a work clamping surface substantially perpendicular to the axis of said threaded means, locking means projecting axially outwardly from said clamping surface, said locking means including a plurality of circumferentially disposed teeth and a continuous annular ring encompassing said teeth and defining the outer radial limits of said teeth, said teeth being provided with a gentle slope in the direction of application and an abrupt locking surface in the direction of removal, said ring in cross section forming an obtuse angle between its radially outward surface and said clamping surface and at least a portion of its inner surface adjacent said teeth being disposed in a plane perpendicular to said clamping surface to form a sharp edge at the juncture of said inner and outer surfaces, said ring having an axial dimension equal to or greater than the axial extent of said teeth, whereby said ring comes into contact with said other member before said teeth engage said member thereby providing tension in said fastener before said locking teeth frictionally engage said member.

2. A device of the type claimed in claim 1 wherein said locking surface of each of said teeth is radially disposed.

3. A device of the type claimed in claim 1 wherein said locking surface of each of said teeth is non-radially disposed.

4. A device of the type claimed in claim 1 wherein said teeth each increase in axial height from their inner to their outer radial limits.

5. A device of the type claimed in claim 1 wherein said teeth have their inner ends radially spaced from said threaded means and the outer ends of said teeth and said ring are spaced inwardly from the peripheral margins of said head.

6. A device of the type claimed in claim 1 wherein said fastener is a screw.

7. A device of the type claimed in claim 1 wherein said fastener is a nut.

References Cited

UNITED STATES PATENTS

| | | | |
|---|---|---|---|
| 2,253,241 | 8/1941 | MacDonald | 151—37 |
| 2,939,160 | 6/1960 | Mitchell | 151—37 |
| 2,959,204 | 11/1960 | Rigot | 151—37 |
| 3,253,631 | 5/1966 | Reusser | 151—41.73 |

CARL W. TOMLIN, *Primary Examiner.*

R. S. BRITTS, *Assistant Examiner.*